US010238962B2

(12) United States Patent
Steele et al.

(10) Patent No.: US 10,238,962 B2
(45) Date of Patent: Mar. 26, 2019

(54) SYSTEM AND METHOD FOR RECHARGING BATTERY IN AUGMENTED REALITY GAME SYSTEM

(71) Applicant: Spin Master Ltd., Toronto (CA)

(72) Inventors: Edwin Steele, Etobicoke (CA); Michael Shivas, Los Angeles, CA (US)

(73) Assignee: SPIN MASTER LTD., Toronto (CA)

( * ) Notice: Subject to any disclaimer, the term of this patent is extended or adjusted under 35 U.S.C. 154(b) by 246 days.

(21) Appl. No.: 14/979,374

(22) Filed: Dec. 27, 2015

(65) Prior Publication Data
US 2017/0182407 A1 Jun. 29, 2017

(51) Int. Cl.
| | |
|---|---|
| *A63F 13/235* | (2014.01) |
| *A63F 13/92* | (2014.01) |
| *A63F 13/213* | (2014.01) |
| *A63F 13/803* | (2014.01) |
| *A63F 9/24* | (2006.01) |
| *B64C 39/02* | (2006.01) |
| *A63H 27/14* | (2006.01) |

(52) U.S. Cl.
CPC ............. *A63F 13/235* (2014.09); *A63F 9/24* (2013.01); *A63F 13/213* (2014.09); *A63F 13/803* (2014.09); *A63F 13/92* (2014.09); *A63H 27/14* (2013.01); *B64C 39/024* (2013.01); *A63F 2009/2435* (2013.01); *A63F 2009/2488* (2013.01); *A63F 2009/2494* (2013.01); *B64C 2201/024* (2013.01); *B64C 2201/042* (2013.01); *B64C 2201/066* (2013.01); *B64C 2201/12* (2013.01); *B64C 2201/146* (2013.01)

(58) Field of Classification Search
None
See application file for complete search history.

(56) References Cited

U.S. PATENT DOCUMENTS

| | | |
|---|---|---|
| 7,689,321 B2 | 3/2010 | Karlsson |
| 9,159,133 B2 | 10/2015 | Ramanandan et al. |

(Continued)

OTHER PUBLICATIONS

Forza Horizon Published by Microsoft Studios in Oct. 2012 (see attached screenshot of http://marketplace.xbox.com/en-US/Product/Forza-Horizon/66acd000-77fe-1000-9115-d8024d5309c9).*

"Forza Horizon Tips: Dak's Garage and Custom Upgrades" published Oct. 26, 2012 by KILLERBanshee at (https://www.youtube.com/watch?v=fPLc-2pwUoc)—see attached youtube screenshot.*

(Continued)

*Primary Examiner* — James S McClellan
*Assistant Examiner* — Peter Iannuzzi
(74) *Attorney, Agent, or Firm* — Millman IP Inc.

(57) ABSTRACT

In an aspect, an augmented reality game system is provided including a mobile smart device such as a smart phone and a remotely controlled drone. The mobile smart phone device is programmed to display an augmented environment, being the real environment viewed by the camera and a virtual environment superimposed over images of the real environment. The drone is controlled via commands transmitted wirelessly by the mobile smart device. The mobile smart device is programmed to execute a video game, which includes activities requiring a player to control the drone in relation to the augmented environment displayed on the mobile smart device video screen. The drone is powered by a rechargeable battery, and the video game includes activities that keep the player occupied with the game while the drone's rechargeable battery recharges.

20 Claims, 6 Drawing Sheets

(56) References Cited

U.S. PATENT DOCUMENTS

| | | | |
|---|---|---|---|
| 2006/0223637 A1* | 10/2006 | Rosenberg | A63F 13/10 |
| | | | 463/47 |
| 2009/0081923 A1* | 3/2009 | Dooley | A63F 9/143 |
| | | | 446/456 |
| 2010/0178966 A1* | 7/2010 | Seydoux | A63F 13/10 |
| | | | 463/2 |
| 2011/0221692 A1 | 9/2011 | Seydoux et al. | |
| 2015/0057844 A1 | 2/2015 | Callou et al. | |
| 2015/0170421 A1 | 6/2015 | Mandella et al. | |
| 2015/0224400 A1* | 8/2015 | Goslin | A63F 13/65 |
| | | | 463/24 |
| 2017/0059326 A1 | 3/2017 | Zhang | |
| 2017/0185081 A1 | 6/2017 | Steele et al. | |

OTHER PUBLICATIONS

Hasunuma et al., Development of Teleoperation Master System with a Kinesthetic Sensation of Presence, 99, Internet. pp. 1-7, 1999.

Sian et al., Whole Body Teleoperation of a Humanoid Robot—Development of a Simple Master Device using Joysticks—, Proceedings of the 2002 IEEE/RSJ Int'l. Conference on Intelligent Robots and Systems, pp. 2569-2574, Oct. 2002.

Kleinert et al., On Sensor Pose Parameterization for Inertial Aided Visual SLAM, 2012 International Conference on Indoor Positioning and Indoor Navigation, IEEE, pp. 1-9, 2012.

Miller et al., Sensitivity Analysis of a Tightly-Coupled GPS/INS System for Autonomous Navigation, IEEE Transactions on Aerospace and Electronic Systems, vol. 48, No. 2, pp. 1115-1135, Apr. 2012.

U.S. Appl. No. 15/385,728, Non-Final Office Action, U.S. Patent & Trademark Office, dated Jun. 7, 2018.

\* cited by examiner

SYSTEM AND METHOD FOR RECHARGING BATTERY IN AUGMENTED REALITY GAME SYSTEM

FIELD OF THE DISCLOSURE

The present disclosure relates to the field of augmented reality games, in particular to techniques for entertaining players whilst recharging the battery of a remote-controlled device (e.g. a remotely piloted flying toy) associated with the augmented reality game.

BACKGROUND OF THE DISCLOSURE

During gameplay with a remote controlled vehicle, it is typical for the device to require recharging. Recharging of such devices takes some time, however, thereby detracting from the enjoyment of their use. This is particularly true for flying toys such as remote controlled helicopters, quadcopters and the like. During recharging, the user can sit idle, waiting until there is enough charge to resume play for a meaningful amount of time, or the user may simply go on to occupy themselves with another activity altogether. It would be beneficial to address this shortcoming of remote controlled vehicles and particularly remote controlled flying toys.

SUMMARY OF THE DISCLOSURE

In one aspect, an augmented reality game system is provided which includes: a mobile smart device, including a data processor operatively connected to a display screen, a user input arrangement, a camera and a wireless transceiver; and a remotely controlled drone, wherein the drone is powered by a rechargeable battery and is controlled via commands transmitted wirelessly by the mobile smart device. The mobile smart phone device is programmed to display an augmented environment, being the real environment viewed by the camera and a virtual environment superimposed over images of the real environment. The mobile smart device is programmed to execute a video game, which video game includes activities requiring a player to control the drone in relation to the augmented environment displayed on the mobile smart device video screen. The video game includes activities that keep the player occupied with the game whilst the drone rechargeable battery recharges.

The video game can alternate between active game sessions in which the player pilots the drone and downtime sessions in which the drone's limited life battery re-charges.

In the active game sessions the video game can be configured to induce the player to pilot the drone through a virtual obstacle course.

In the active game sessions the video game can be configured to induce the player to pilot the drone to accomplish one or more virtual missions. The player can be rewarded with escalating rewards correlated to increasing number of missions completed in an active game session.

The active game session of the video game can be configured to induce the player to pilot the drone to a virtual facility, whereby the drone is brought to rest at a designated position for battery recharging.

The mobile smart phone device can be programmed to selectively vary the capability of the drone, and the player's performance in the video game during the downtime session can be correlated to the drone's capability in the active game session. The drone capability can include one or more of real performance capability such as: response time to virtual control; acceleration rate; maximum speed; precision; and pre-programmed maneuvers. Likewise, the drone capability can include one or more virtual capability such as: virtual weapon capability; virtual health; virtual rewards; virtual bodies; and unlocking augmented environments.

During the downtime session the video game can keep the player immersed in the game by requiring the player to perform virtual activity related to the maintenance of the drone. The maintenance can be correlated to a player's physical activity which is monitored or measured by the mobile smart device.

In another aspect, an augmented reality game system is provided. The system includes a mobile smart device, including a data processor operatively connected to a display screen, a user input arrangement, a camera and a wireless transceiver. The system further includes a remotely controlled vehicle. The vehicle is controlled via commands transmitted wirelessly by the mobile smart device, and wherein the vehicle is powered by a rechargeable battery. The mobile smart phone device is programmed to display an augmented environment, being the real environment viewed by the camera and a virtual environment superimposed over images of the real environment. The mobile smart device is programmed to execute a video game, which includes activities requiring a player to control the vehicle in relation to the augmented environment displayed on the mobile smart device display screen. The video game includes activities that keep the player occupied with the game whilst the vehicle rechargeable battery recharges.

BRIEF DESCRIPTION OF DRAWINGS

The foregoing and other aspects of the disclosure will be more readily appreciated by reference to the accompanying drawings, wherein:

FIG. 5

DETAILED DESCRIPTION

The augmented reality game described herein employs a remotely-controlled device such as a toy quadcopter or helicopter (or any other suitable flying toy) or such as a wheeled vehicle, referred to herein as a 'drone', in combination with a video game. The remote controlled device or drone may alternatively be referred to as a remote-controlled vehicle. A player controls the drone while engaging in missions and completing goals in the companion video game. The virtual environment of the video game is projected in augmented reality through a display screen such as a smart phone or tablet and the drone interacts with the augmented (real and virtual) environment, for example to move to different locations in physical space whilst shooting virtual aliens, putting out virtual fires and rescuing virtual people.

Figure 1:
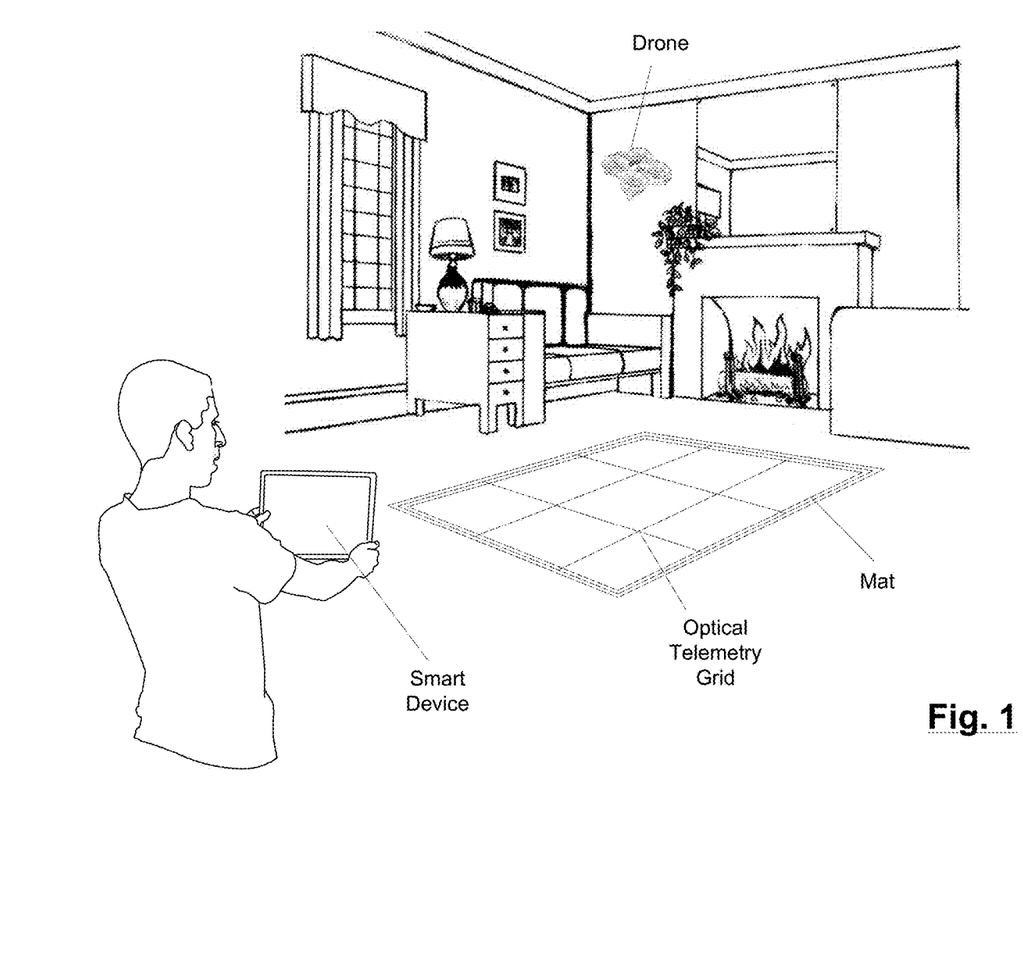
FIG. 1 is a perspective view of components employed to play an augmented reality game in accordance with an embodiment of the present disclosure.

FIG. 1 shows the major elements of the augmented reality game. The game is played within a real environment, illustrated as a living room in FIG. 1, although any physical environment is possible (provided it is conducive to image processing requirements as discussed in greater detail below). A player controls the drone through a smart phone or tablet or any other such 'mobile smart device' having a data processor, display screen, a user input arrangement such as keyboard or touch screen, forward facing camera, and wireless communication capability such as Bluetooth (BLE) which enables the mobile smart device to communicate with the drone. In addition, a game mat is provisioned which provides an odometry reference in that it incorporates an optical reference grid, as discussed in greater detail below.

Figure 2:
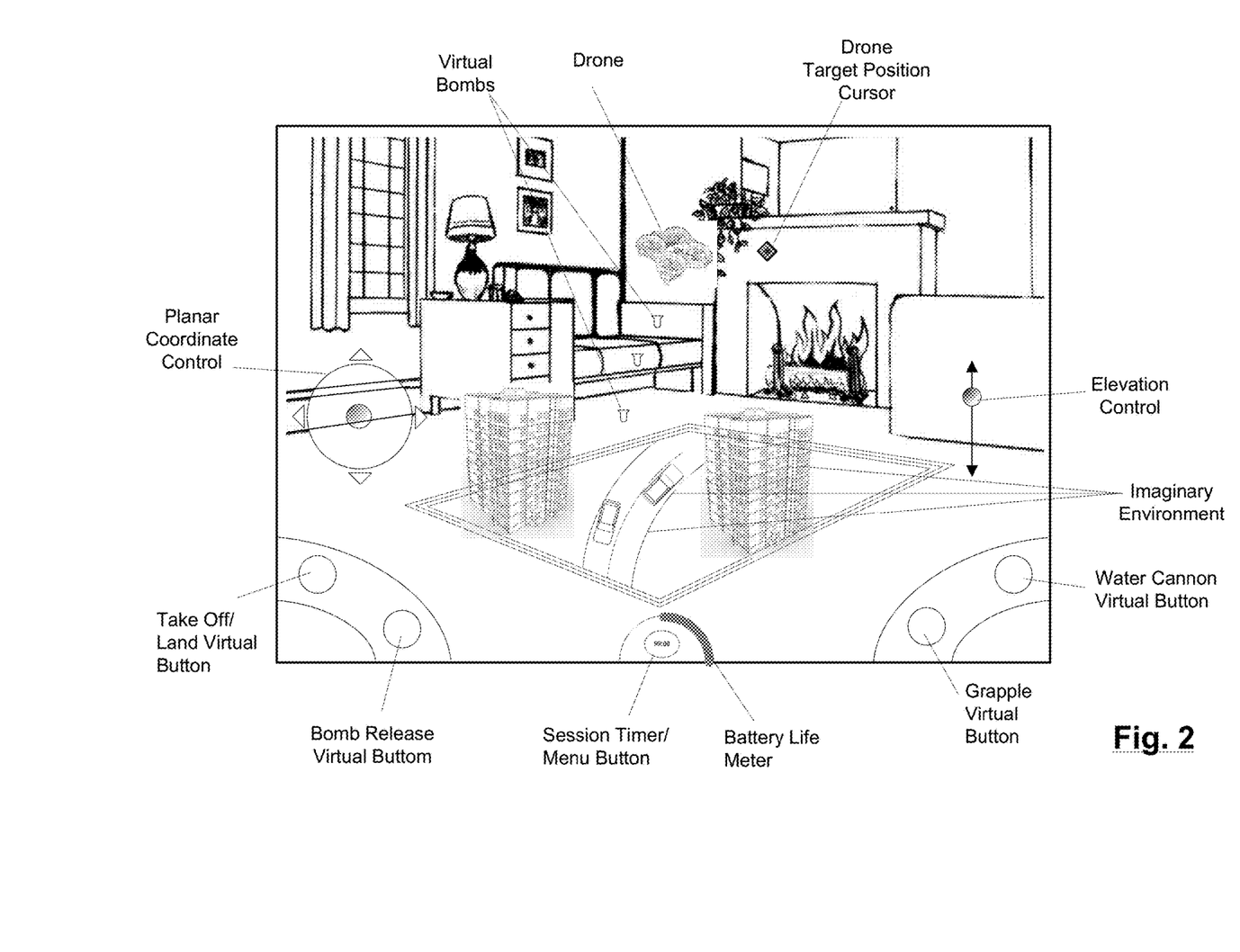
FIG. 2 shows a screen display on a smart device used during the augmented reality game.
Figure 3:
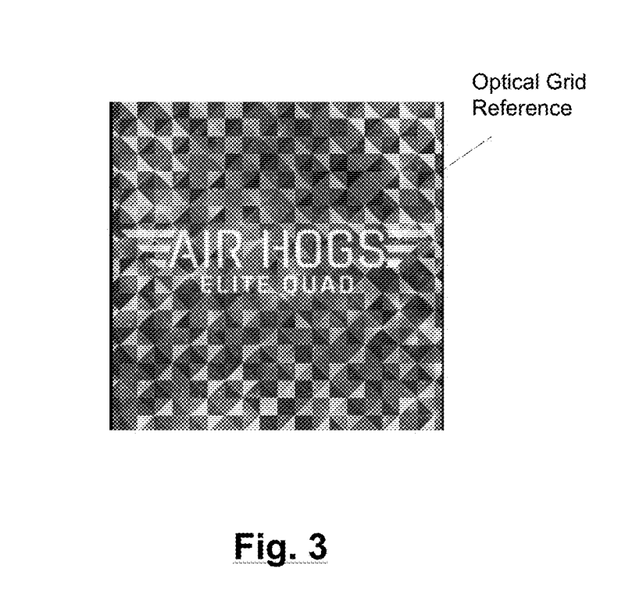
FIG. 3 is an example of an optical grid reference that may be provided on an example mat that is among the components shown in FIG. 1.
Figure 4:
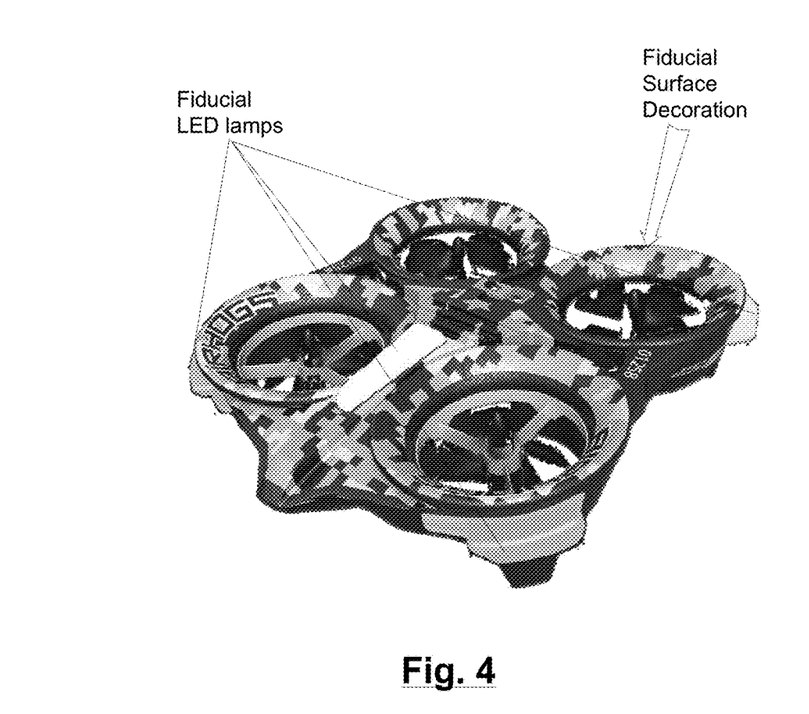
FIG. 4 is a perspective view of an example device, namely a flying drone, that is among the components shown in FIG. 1.

FIG. 2 shows a screen shot of the mobile smart device display screen in an example embodiment of an augmented reality game which employs a flying drone. The screen shot shows the real environment as viewed by the front facing camera of the mobile smart device. The screen also displays the virtual environment (comprising, in this illustration, images of buildings, landscape and vehicles), which is provisioned as a three dimensional projection over the game mat. The real drone is displayed, along with virtual projectiles emanating therefrom. In addition, the mobile smart device display screen overlays game informational and control graphics over the images of the real and virtual environments.

The game control and informational graphics may vary depending on the particular design of the augmented reality game. In the embodiment shown in FIG. 2, the control and informational graphics relate to real control of the drone and interaction with the virtual environment. More particularly, the game control and informational graphics in FIG. 2 include:

Take Off/Land Virtual Button—when pressed causes a grounded drone to take off to a pre-designated position or causes the flying drone to land at a pre-designated position Elevation Virtual Joystick—sets the elevation of the flying drone Planar Coordinate Virtual Joystick—sets the planar position of the flying drone Bomb Release Virtual Button—shoots virtual bombs from the flying drone Water Cannon Virtual Button—shoots a virtual water cannon from the flying drone (to put out fires started by ravaging aliens)

Grapple Virtual Button—extends and operates a virtual grappling hook from the flying drone (to save bystanders and capture aliens)

Battery Life Meter—shows the remaining life of the drone onboard battery

Session Timer/Menu Button—shows the time remaining in the current game play session or level 2.0 Control UI For the purposes of game play, it is desirable that a flying drone be easy to control, particularly for younger children, so that the player's attention is focused on the game as opposed to the mechanics of flying the drone. To this end, a number of improvements may be provisioned in the control user interface and corresponding automated controls which reduce the complexity of controlling the flying drone.

First, the drone control system preferably employs an embedded controller which stabilizes hover so that the player does not have to worry about trimming the controls in order to respond to external influences such as wind, air density, battery level and the like. Short of equipping the flying drone with infrared or sonic range-finding sensors, it has hitherto been difficult to implement an extremely stable hover for flying drones. The stable hover is made possible in part through reliable optical tracking of drone position, as discussed in greater detail below.

Second, the flying drone is visualized in its augmented environment by the mobile smart device which includes virtual controls for flying the drone. To this end the drone control system orients the flying drone so that it substantially always faces away from the player. This enables the virtual controls for the flying drone to substantially always retain their effective orientation relative to the player, thus providing so-called 'headless' control. For example, the flying drone may be controlled via the Elevation Virtual Joystick and the Planar Coordinate Virtual Joystick as shown in FIG. 2. By keeping the relative orientation of the flying drone to the smart device constant, the 'left' and 'right' directions of the Planar Coordinate Virtual Joystick will always move the flying drone to the left and right, relative to the player, making it easier and more intuitive to control the flying drone for younger players.

It should also be appreciated that in the embodiment shown in FIG. 2, there are no virtual controls for rotating the flying drone, only for translating it (i.e., left, right, front, rear). In reality the flying drone will necessarily rotate in order to move from point to point and keep its orientation facing away from the smart device, but this detail is automatically handled by the drone control system, making it easier and more intuitive to control the flying drone for younger players.

Third, in order to further enhance game play, the flying drone control system preferably also includes an end or target position control mode. In this mode the player identifies an end position to which the player wishes to move the drone, and the control system automatically takes care of flying the drone to the indicated position.

In some embodiments the target position control may be implemented by the player simply pressing and holding on the image of the flying drone on the mobile smart device touch screen display, at which point a duplicate ghost image of the flying drone is presented to the player who can then move the ghost image to the target position.

Additionally or alternatively, in some embodiments the target position control may be accomplished by via the Elevation Virtual Joystick and the Planar Coordinate Virtual Joystick, as seen in FIG. 2. In normal mode, these virtual joysticks are substantially real time controls in that the movement of the sliders in these virtual controls causes corresponding directional movement of the flying drone. However, in the target position control mode these joysticks control a drone target position cursor (shown as a diamond in FIG. 2 but may be any desired graphic including a duplicate or ghost image of the flying drone) which may be manipulated to point to the desired target position, following which the drone control system moves the flying drone to the target position.

Entertaining the Player During Battery Charging

The virtual game alternates between active game sessions in which the player pilots the drone and downtime sessions while the player waits for the drone's limited life battery to re-charge.

In preferred embodiments the player is kept busy playing the game while the drone battery charges.

For example, in one aspect, while the drone is charging the downtime can be filled with a series of activities such as chores and/or choices relating to the drone that may provide or use rewards. For instance, game play during battery charging time may require the player to carry out virtual maintenance chores such as repairing, cleaning, waxing and polishing a virtual drone. Alternatively during battery charging the player may be required to research new characters, or undertake challenges such as finding or unlocking new objects. For such activity the player may be awarded additional credits, unlock new functionality, including new functionality or flight properties of the drone itself, e.g., more accurate closed loop control of the drone, more physical range, more or a greater variety of virtual weapons.

Figure 5:
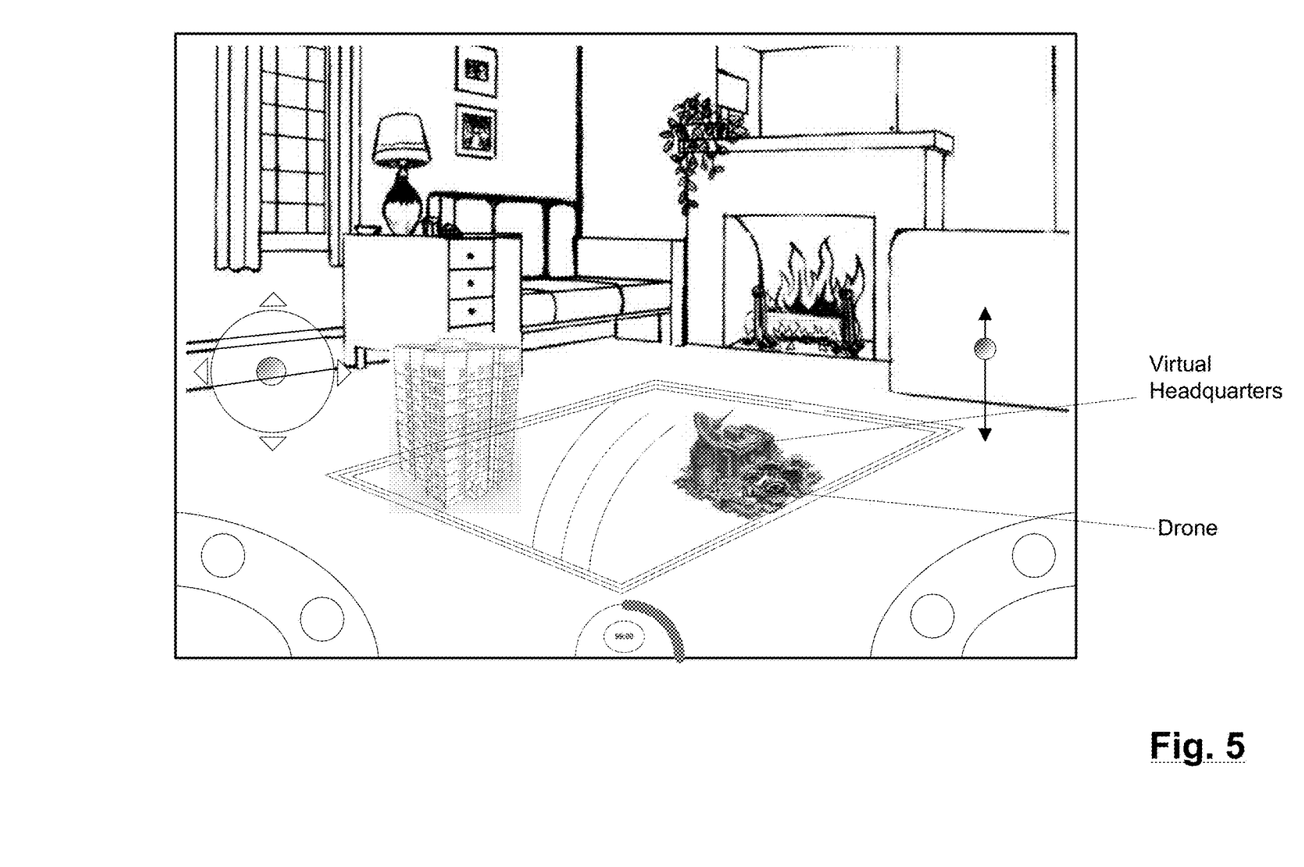
FIG. 5 shows a screen display on the smart device whilst the flying drone is recharged.

More particularly, the augmented environment can include a virtual maintenance port or headquarters, as symbolized in FIG. 5. One object of the augmented reality game could be to land the flying drone adjacent the virtual headquarters. Once landed, the player can charge the battery of the flying drone and view the flying drone within the context of or with the background of the virtual headquarters.

It will be noted therefore that the active game sessions and the downtime sessions both occur in the same augmented environment. In other words, game play is essentially continuous for the player when transitioning between an active game session and a downtime session.

The drone flying time will depend on the size of the battery, which will typically depend on the cost of the flying drone. For relatively inexpensive toys for younger children, the drone flying time is expected to be anywhere from about 5 minutes to 30 minutes, and more typically likely to be within the range of 10 minutes to 20 minutes. The battery charging time is expected to be at least as long as the flying time, and more likely over twice as long. For instance, 15 minutes of lying time may require a battery recharge time of about 45 minutes. Given the expected relative length of time for battery charging, it would be desirable to keep the player entertained during this period of time by continuing to play the augmented reality game with the flying drone being a continued object or focus of the game.

Thus, for example, once the flying drone has landed at the virtual headquarters, the augmented reality game can be programmed to show a zoomed in view of the virtual headquarters and the flying drone. This may be accomplished, for instance, by the player touching the image of the virtual headquarters. The image of the real flying drone can be replaced with a virtual image thereof or a hybrid image of the flying drone, either of which ("augmented drone") shows artifacts of game play such as scarred or broken portions of hull, dirty spots, or other such visual consequences of flying the drone during any given mission between battery recharging sessions. For instance, the augmented drone can become dirty and dusty after each mission, and the player can be entertained by inducing him or her to carry out various virtual maintenance activities on the augmented drone in return for bonus points, i.e., flying a shiny, clean, fully repaired drone will give a small bonus in scoring points.

In this view, the player can tap different spots that need to be repaired. Once a spot is tapped it can be highlighted and a small virtual repair droid can fly to the spot and begin to virtually repair the hull or an appendage thereof. This can be done virtually, or the game can require that the player execute a manual action such as rubbing the display screen at the appropriate region, shaking the smart device, or requiring the player to do some physical activity that can be measured such as hop, skip, jump etc. This basic repair activity, if any is necessary depending on how successful the player was during the active flying session, can take anywhere from a few minutes to a considerably longer period of time.

Likewise, in this view, the player can tap different spots that need to be cleaned. Once a spot is tapped it can be highlighted and a small virtual cleaning droid can fly to the spot and begin to virtually spray the dirt away. This too can be done virtually, or the game can require that the player execute a manual action such as rub the display screen at the appropriate region or shake the smart device. Once the dirt is virtually removed away there can be a small chance that the dirty spot hid a game resource, such as a new weapon, shield or health, in which case the player will have to tap the resource within 10 seconds to claim it. Cleaning all dirty spots can also take a few minutes to a considerably longer period of time depending on the dirtiness or damage level of the augmented drone. The player can tap all dirty or damaged spots at once and just leave the game, but that way he or she will not be able to claim hidden game resources.

As described above, the maintenance that may be needed or that may be carried out may be correlated to virtual events that occurred to the drone during at least a preceding active game session.

After all virtual dirty spots have been cleaned and/or damaged portions of the augmented drone have been repaired, the augmented reality game can be configured so that the player has the possibility to initiate virtual waxing with a virtual waxing device. Waxing can cost a small amount of credits but can yield a "shiny bonus" to scoring in the next mission. Waxing can take a few minutes to do and again can require the player to undertake a manual action such as rubbing the display screen at the appropriate region or shaking the smart device.

In an example embodiment, the cleaning mechanic can give the player multiple choices allowing the player to decide how much time they want to invest in the game during battery recharging. For instance, the following reward structure can be deployed in the augmented reality game:

| Strategy | Time invested | Result |
| --- | --- | --- |
| Don't clean at all | 0 | No "shiny" point bonus during next flying session |
| Initiate cleanup after end session and then wax in the beginning of next session | 1-2 minutes to clean up Pause 2 minutes to wax | Player receives "shiny" bonus during next flying session |
| Actively doing cleanup, then initiate waxing right after cleanup | 3-5 minutes clean up 15 seconds to initiate waxing | Possibility to earn game resource; Player earns "shiny" bonus during next flying session No waiting time before next play session |

Likewise, additional or alternative maintenance activities can be envisioned such as polishing, virtual refueling or restocking supplies such as virtual weapons.

In further play, the player can continue to be immersed in the augmented reality game while the flying drone recharges its battery charging by using the uncovered resources to research new upgrades for the flying drone and characters. The player can choose the number of resources he or she wants to use to research. These will be in preset amounts. The amount of resources used will determine the likelihood of receiving rare upgrades. For instance, the following upgrade scheme can be used:

| Resources | Credits/<br>Temporary<br>Bonus | Common<br>Upgrade | Uncommon<br>Upgrade | Rare<br>Upgrade |
|---|---|---|---|---|
| 1 | 50% Chance | 34% | 15% | 1% |
| 5 | 35% | 35% | 25% | 5% |
| 10 | 25% | 35% | 30% | 10% |
| 20 | 20% | 25% | 35% | 20% |

Once something has been researched it could be made available in a virtual shop to be purchased with game credits and/or money. These upgrades can, for instance, fall into one of two categories: bodies and performance upgrades. Bodies change the virtual appearance of the flying drones; initially these can just be cosmetic but more expensive bodies could alter the flying drones base statistics. Performance upgrades include:

engines, providing the flying drone with faster acceleration, speed etc.;
health upgrades, providing the flying drone with more virtual stamina or shielding;
stunt capabilities, unlocking virtual controls which allow the flying drone to perform real pre-programmed stunts such as loops, spins, rollovers, dive bombing;
weapon upgrades, providing greater power, range or capability to virtual weapons.

Finding good combinations and synergies between upgrades should be an interesting activity.

The augmented reality game can require the player to carry out other such virtual or real activities whilst battery recharges.

Figure 6:
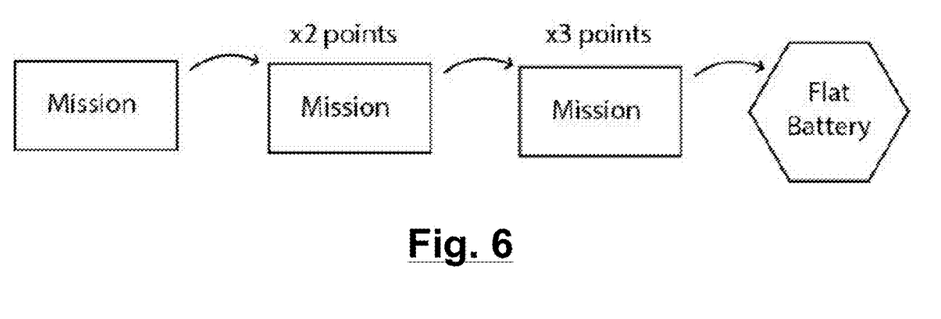
FIG. 6 is a schematic diagram of a game reward scheme based on player performance during an active session.

In another aspect, during the downtime while the player waits for the drone's battery to charge in between active game sessions in which the user pilots the drone, the augmented reality game can be programmed to make the limited battery life an active component of the game. For instance, an overall goal for the player can be to maximize the amount of points or rewards gained during one full charge of the battery. Every time the player completes a mission within one flying session, the player's reward can be multiplied as schematically shown in FIG. 6. Completing missions quickly will allow for more missions to be played on one battery, increasing the player's score.

Figure 7:
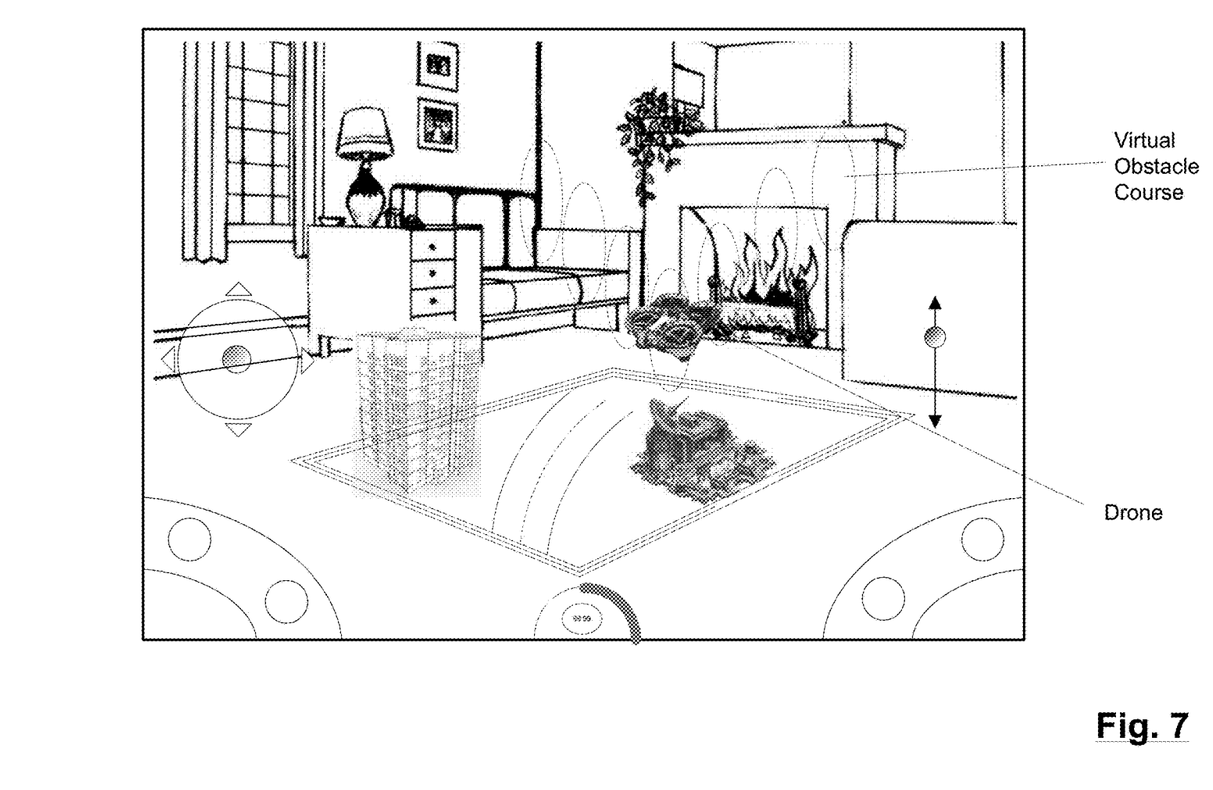
FIG. 7 shows a screen display on the smart device in which the drone flies through an obstacle course.

Missions can vary according to the augmented reality but preferably require the player to pilot the drone to achieve maneuvers of increasing complexity as the game progresses. Examples of piloting activities include:

moving to designated positions to shoot projectiles whose path is effected by simulated gravity
moving to designated positions to lower a virtual grappling hook dangling from a virtual rope to capture virtual characters, spray virtual water, drop virtual commandos;
maneuvering through a virtual obstacle course such as elevated hoops (for flying drones), as seen in FIG. 7, or such as a virtual road course (for wheeled drones).

In some embodiments described herein, the system is programmed to select activities that keep the player occupied for a selected amount of time, wherein the selected amount of time is selected based on the amount of charging that the drone will require to reach a selected level of charge (e.g. full charge), which is also related to the amount of charge that the drone possesses at the time that the system is selecting the activities. For example, if the smart device determines that the drone's battery is highly depleted, the smart device selects a first, longer set of activities to be carried out during charging of the drone rechargeable battery, whereas if the smart device determines that the drone's battery is less depleted, the smart device can select a second, shorter set of activities to be carried out during charging of the drone rechargeable battery.

In this disclosure the terms module, block, processing step have been used interchangeably as those skilled in the art will understand that a given logical function can be carried out via software executed over a data processor, via dedicated hardware, or a combination of both. Further, in practice in not necessary that particular function or processing block be carried out in a segmented software module or hardware module, rather the functional equivalent can be carried out over a distributed system. Those skilled in the art will understand that a variety of other modifications may be effected to the embodiments described herein without departing from the scope of the appended claims.

The invention claimed is:

1. An augmented reality game system, comprising:
a mobile smart device having a data processor, a display screen, a user input arrangement, a camera, and a wireless transceiver;
a remotely controlled drone, wherein the drone is controlled via commands transmitted wirelessly by the mobile smart device, and wherein the drone is powered by a rechargeable battery; and
wherein the mobile smart device is programmed to display an augmented environment, being a real environment including the remotely controlled drone viewed by the camera and a virtual environment superimposed over images of the real environment,
wherein the mobile smart device is programmed to execute a video game, which video game includes activities requiring a player to control the drone in relation to the augmented environment displayed on the mobile smart device video screen, and
wherein the video game includes activities selected by the mobile smart device to keep the player occupied with the game whilst the drone rechargeable battery recharges.

2. A system according to claim 1, wherein the video game alternates between active game sessions in which the player pilots the drone and downtime sessions in which the drone's limited life battery re-charges.

3. A system according to claim 2, wherein in the active game sessions the video game is configured to induce the player to pilot the drone to accomplish one or more virtual missions, and wherein the player is rewarded with escalating rewards correlated to increasing number of missions completed in an active game session.

4. A system according to claim 1, wherein in the active game session the video game is configured to induce the player to pilot the drone to a virtual facility corresponding to a designated position for battery recharging.

5. A system according to claim 2, wherein the mobile smart device is programmed to selectively vary the capability of the drone, and wherein the player's performance in the video game during the downtime session is correlated to the drone's capability in the active game session.

6. A system according to claim 5, wherein the drone capability includes one or more real capabilities such as:
response time to virtual control
acceleration rates
maximum speed precision
pre-programmed maneuvers.

7. A system according to claim 5, wherein the drone capability includes one or more virtual capabilities such as:
virtual weapon capability
virtual health
virtual rewards
virtual bodies
unlocking augmented environments.

8. A system according to claim 5, wherein, during the downtime session, the video game keeps the player immersed in the video game by requiring the player to perform virtual activity related to the maintenance of the drone, and wherein said maintenance is correlated to the player's physical activity which is monitored or measured by the mobile smart device.

9. A system according to claim 5, wherein, during the downtime session, the video game keeps the player immersed in the video game by requiring the player to perform virtual activity related to the maintenance of the drone, and wherein said maintenance is correlated to virtual events that occurred to the drone during at least a preceding active game session.

10. A system according to claim 9, wherein both the active game sessions and the downtime sessions occur in the same augmented environment.

11. A system according to claim 2, wherein in the active game sessions the video game is configured to induce the player to pilot the drone through a virtual obstacle course.

12. A system according to claim 1, wherein the activities to keep the player occupied with the game whilst the drone rechargeable battery recharges, are selected based on the amount of charging that the drone will require to reach a selected level of charge.

13. A system according to claim 1, wherein the activities to keep the player occupied with the game whilst the rechargeable battery of the drone recharges are selected by the mobile smart device based on the amount of charge that the rechargeable battery of the drone possesses.

14. A system according to claim 1, wherein, if the smart device determines that the rechargeable battery of the drone is highly depleted, the smart device selects a first, longer set of activities to be carried out during charging of the rechargeable battery of the drone, and if the system determines that the rechargeable battery of the drone is less depleted, the smart device selects a second, shorter set of activities to be carried out during charging of the rechargeable battery of the drone.

15. An augmented reality game system, comprising:
a mobile smart device having a data processor, a display screen, a user input arrangement, a camera, and a wireless transceiver;
a remotely controlled vehicle, wherein the vehicle is controlled via commands transmitted wirelessly by the mobile smart device, and wherein the vehicle is powered by a rechargeable battery; and
wherein the mobile smart device is programmed to display an augmented environment, being a real environment including the remotely controlled drone viewed by the camera and a virtual environment superimposed over images of the real environment,
wherein the mobile smart device is programmed to execute a video game, which includes activities requiring a player to control the vehicle in relation to the augmented environment displayed on the mobile smart device display screen, and
wherein the video game includes activities selected by the mobile smart device to keep the player occupied with the game whilst the vehicle rechargeable battery recharges.

16. A system according to claim 15, wherein, during the downtime session, the video game keeps the player immersed in the video game by requiring the player to perform virtual activity related to the maintenance of the drone, and wherein said maintenance is correlated to virtual events that occurred to the drone during at least a preceding active game session.

17. A system according to claim 16, wherein both the active game sessions and the downtime sessions occur in the same augmented environment.

18. A system according to claim 15, wherein the vehicle is a flying toy.

19. A system according to claim 15, wherein the activities to keep the player occupied with the game whilst the drone rechargeable battery recharges, are selected based on the amount of charging that the drone will require to reach a selected level of charge.

20. A system according to claim 15, wherein, if the smart device determines that the drone's battery is highly depleted, the smart device selects a first, longer set of activities to be carried out during charging of the drone rechargeable battery, and if the system determines that the drone's battery is less depleted, the smart device selects a second, shorter set of activities to be carried out during charging of the drone rechargeable battery.

* * * * *